United States Patent [19]

Mount

[11] Patent Number: 5,211,277

[45] Date of Patent: May 18, 1993

[54] VIBRATORY CONVEYOR

[75] Inventor: Michael J. Mount, Uxbridge, England

[73] Assignee: Wright Machinery Company Limited, Uxbridge, England

[21] Appl. No.: 706,982

[22] Filed: May 29, 1991

[51] Int. Cl.⁵ .............................................. B65G 47/46
[52] U.S. Cl. .................................... 198/358; 198/365; 198/370; 198/751
[58] Field of Search ............... 198/358, 370, 751, 752, 198/753, 760, 763, 769, 770, 771, 365

[56] References Cited

U.S. PATENT DOCUMENTS

| | | | |
|---|---|---|---|
| 3,543,916 | 12/1970 | Berk | 198/220 |
| 3,731,787 | 5/1973 | Gregor | 198/358 |
| 3,917,050 | 11/1975 | Gregor | 198/358 |
| 4,260,051 | 4/1981 | Burghart | 198/763 X |
| 4,768,647 | 9/1988 | Lehtola | 198/760 |
| 4,813,532 | 3/1989 | Harper | 198/763 X |
| 4,913,281 | 4/1990 | Muller | 198/763 |

FOREIGN PATENT DOCUMENTS

| | | |
|---|---|---|
| Au-B1-24 060/77 | 4/1977 | Australia . |
| 2052013 | 4/1972 | Fed. Rep. of Germany . |
| 1245164 | 9/1971 | United Kingdom . |
| 2101950 | 1/1983 | United Kingdom . |
| 2155885A | 10/1985 | United Kingdom . |

Primary Examiner—Joseph E. Valenza
Assistant Examiner—Tuan N. Nguyen
Attorney, Agent, or Firm—Darby & Darby

[57] ABSTRACT

A conveyor system is provided for transporting a product such as a snack food product or crisps. A plurality of main line conveyors are arranged end to end, and a crossfeeder conveyor extends transversely from a lateral edge of the downstream end of each main line conveyor. The main line conveyors are arranged to vibrate both longitudinally and laterally, for example by the use of leaf springs arranged at an angle. Selective actuation of the various main line conveyors and crossfeeder conveyors enables product to be transported to selected ones of the crossfeeder conveyors as desired.

9 Claims, 6 Drawing Sheets

VIBRATORY CONVEYOR

BACKGROUND OF THE INVENTION

This invention relates to a vibratory conveyor and more particularly to a vibratory conveyor which permits movement of product in the normal direction of flow for such a conveyor, and also permits discharge of product through a side aperture of the conveyor, moving the product transversely to the normal-direction of flow.

Vibratory conveyors are generally used industrially to move fragile, small or lightweight articles from one point to another. An example of a distribution system is that normally used in the snack food and crisp industries where a series of main line conveyors transport products to crossfeeder conveyors set at right angles to the main line conveyors, each crossfeeder conveyor supplying a packaging machine. The interface between the main line conveyors and crossfeeder conveyors needs to be arranged so that product can either be conveyed to the main line conveyor, or to the crossfeeder conveyor, or to both conveyors simultaneously.

One known type of main conveyor is shown diagrammatically in FIGS. 1 and 2a. The type of conveyor comprises a frame 11, a tray 12 for receiving product, the tray being mounted to the frame by resilient means comprising at least one flexure 13 inclined to the vertical, and a drive system (not shown) to vibrate the tray within the path defined by the flexure. The flexures are typically fibre glass leaf springs, and the consequences of the arrangement is that product is thrown forward in the direction of conveyance with each cycle of the drive system. The springs are arranged so that product is conveyed along the tray, i.e. the direction of vibration is along the tray's length.

The crossfeeders are generally arranged so that their upstream ends are located at the downstream ends of the main line conveyors. If the crossfeeder intrudes into the main line, then it is necessary for product to pass across the crossfeeder from one main line conveyor to the next, except in the case of the last crossfeeder or in a case where no product is required downstream of a particular crossfeeder. For this purpose either the crossfeeder must be capable of conveying product transversely with respect to its length, as well as along its length, or one has to rely on the product being pushed across the crossfeeder by the force exerted on it by product which is still on the main line conveyor on the upstream side. Alternatively, the main conveyors may be butted against one another with side discharge apertures onto the crossfeeders. With present equipment, feeding onto a crossfeeder is most normally achieved either with a diverter which encourages product towards the aperture or by inclining the main conveyor (as in GB-A-2101950) so that product falls through the aperture. Both these arrangements require increased mechanical complexity and the inclined conveyor system results in increased grading by size of the particles of product.

SUMMARY OF THE INVENTION

It is an object of the invention to provide a simple mechanism by means of which the above problems can be overcome.

According to the invention there is provided a vibratory conveyor system for transporting a product, comprising at least one main line conveyor; a crossfeeder conveyor extending transversely from a lateral edge of the downstream end of the main line conveyors; vibration means for imparting to at least the upstream end of the main line conveyor a vibratory movement having a component tending to a transport product longitudinally along the main line conveyor and a component tending to transport product towards the said lateral edge; and means provided wherein the crossfeeder conveyor meets the main line conveyor for permitting product to pass from the main line conveyor to the crossfeeder conveyor.

DETAILED DESCRIPTION

Figure 3:
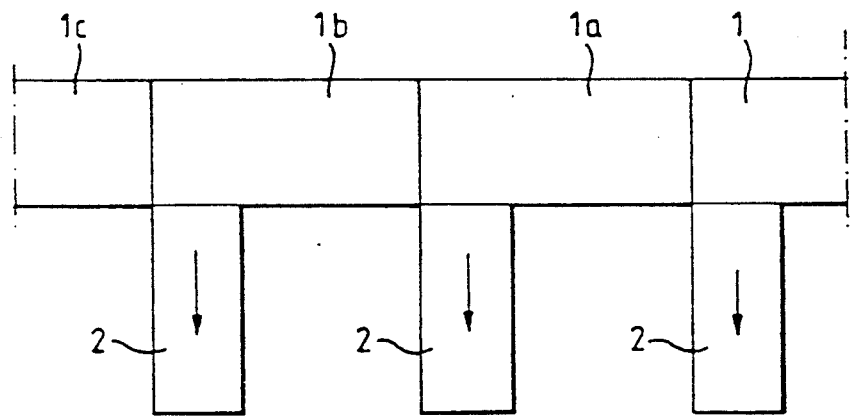
FIG. 3 is a schematic plan view of a typical arrangement of a main conveyor and a number of crossfeeders.

Referring first to FIG. 3, it will be seen that there is a succession of main line conveyors 1, 1a, 1b, 1c arranged one after the other, with a cross feeder 2 at the downstream end of each main line conveyor, except, optimally, the one furthest downstream. The upstream ends of the crossfeeders 2 are disposed laterally of the main line conveyors. Where each crossfeeder adjoins its respective main line conveyor there is an aperture in the side wall of the tray 12 of the main line conveyor to allow product to pas from the main line conveyor on to the crossfeeder. It is also possible to use a single main line conveyor with a succession of side wall apertures which adjoin a corresponding succession of cross feeders.

Figure 2A:
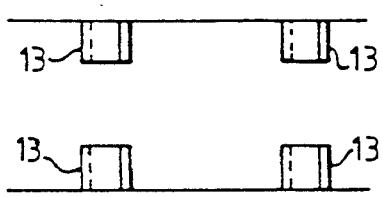
FIG. 2 and 2b are plan views of the spring arrangement of FIG. 1 and spring arrangement which may be used in the invention.
Figure 2B:
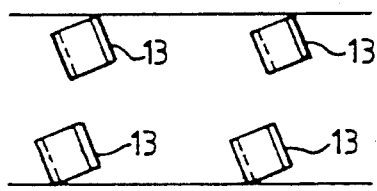

As shown in FIG. 2b, the mountings of the springs 13 on both the frame and tray, when viewed from above, are angled. As a consequence the major component of vibration is in the usual longitudinal direction but there is also a smaller component of vibration at right angles to this. This latter component encourages product to move to one side of the tray. Hence, when there is an aperture in the side wall of the tray a amount of product falls through the aperture onto the adjacent crossfeeder conveyor 2. The amount of product falling through the aperture depends on the offset angle of the leaf springs and on the width of the aperture.

Figure 4A:
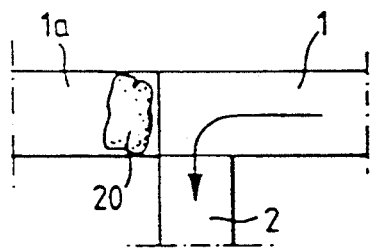
FIGS. 4a to 4c are schematic plan views showing three alternative feeding configurations which the conveyor of the invention may adopt.

If the main line conveyor 1 is energised and the next main line conveyor 1a is not energised, then, when the crossfeeder 2 requires product, and is energised, a small mound 20 of product forms on the unenergised conveyor and all the product moving along the energised main line conveyor will fall through the aperture, being prevented from further forward movement by the mound of product. This is shown in FIG. 4a.

Figure 4B:
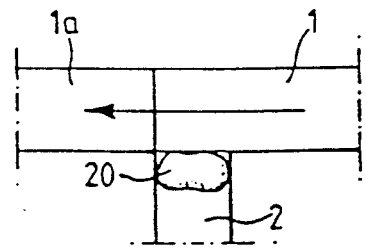

If the main line conveyors 1 and 1a are both energised and the crossfeeder is deenergised, then a mound 20 of product forms on the crossfeeder preventing any product from falling through the aperture, so all the product passes from one main conveyor to the next. This is shown in FIG. 4b.

Figure 4C:
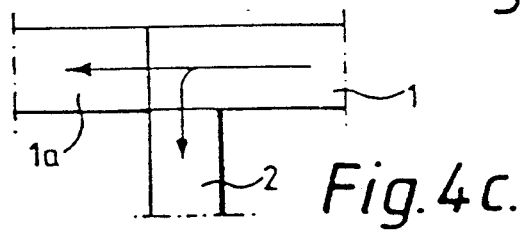

If the main line conveyors 1 and 1a are both energised, and the crossfeeder is energised then some of the product falls onto the crossfeeder and some passes to the next main line conveyor. This is shown in FIG. 4c.

Figure 1:
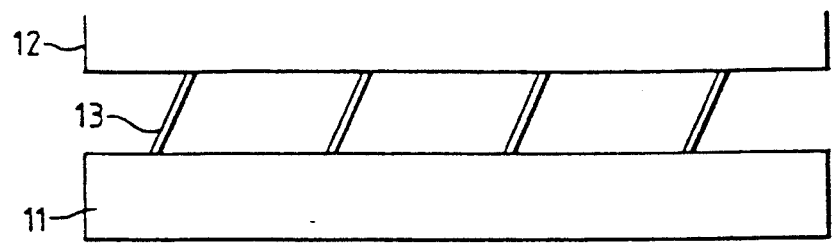
FIG. 1 is a side elevation of a conventional vibratory conveyor, as already mentioned.

Each of the main line conveyors is of the type shown in FIGS. 1 and 2b except, optionally, the one furthest downstream.

If it is required that no product should pass onto a particular crossfeeder for a period of time, than a gate can be inserted, either manually or by some power driven means, into the aperture adjacent to that crossfeeder.

Although the above description refers specifically to the use of leaf springs to mount the main conveyor, on the base, other means, for example rubber mounts, could be used instead.

Figure 5A:
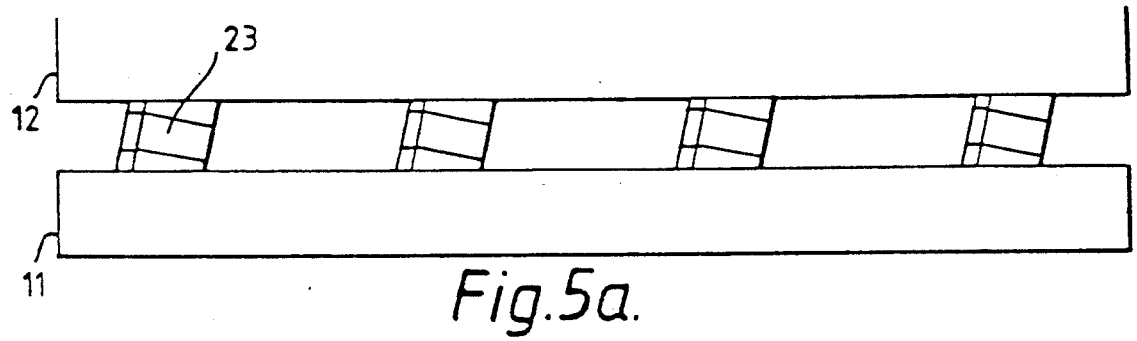
FIGS. 5a and 5b are sectional and plan views of an alternative embodiment of the vibration means of the invention.
Figure 5B:
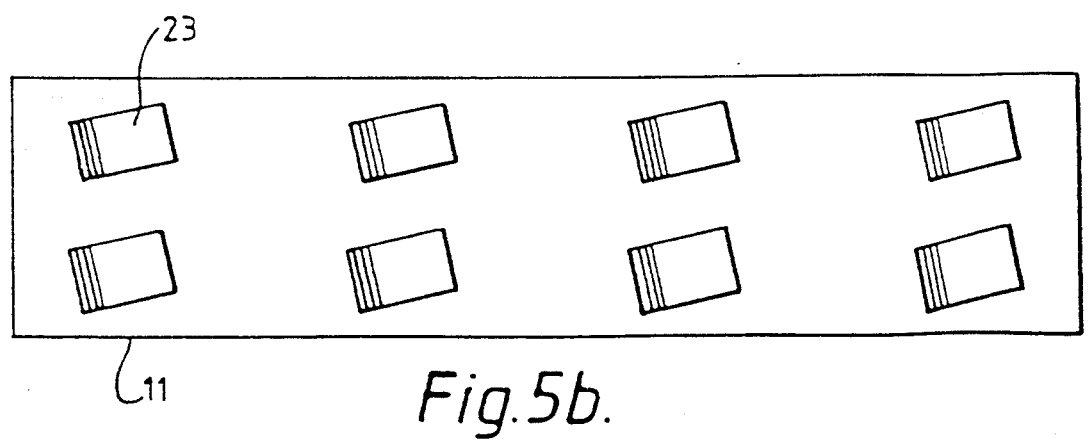

FIG. 5a and 5b show a conveyor comprising, as in the previous embodiment, a frame 11, a tray 12 for receiving product, and rubber mounts 23 supporting the tray on the frame. The rubber mounts 23 may be driven in the same way as the leaf springs 13 described earlier.

If the rubber mounts have a preferred direction of vibration (as illustrated) it is possible, as is case for the leaf springs, for the drive means to apply a force parallel to the length of the main line conveyors; the resulting vibration will still contain a component of vibration at right angles to the length of the main line conveyors, provided the rubber mounts are correctly disposed. If the rubber mounts have no such preferred direction of vibration then they must be driven in a direction which is inclined at an acute angle to the length of the main line conveyors. This can be achieved either by using a single drive means which applies drive at the requisite angle, or by using two drives acting transversely to one another to provide respectively the longitudinal and lateral vibration.

Figure 6:
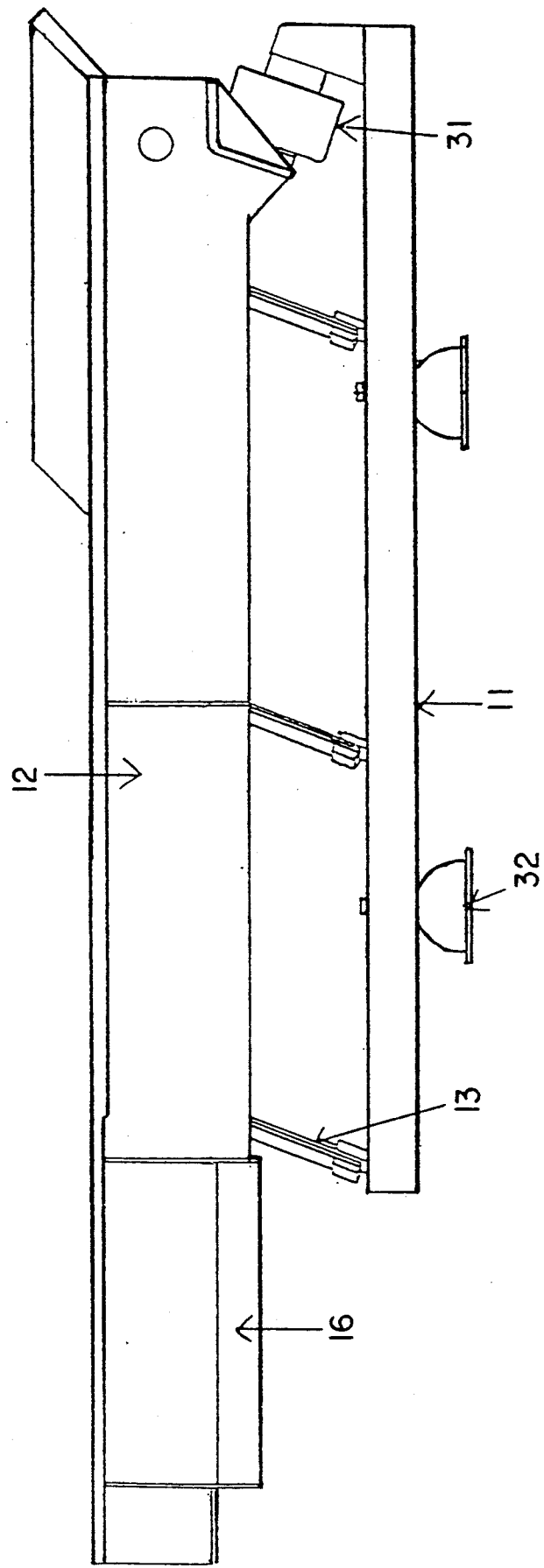
FIG. 6 is a side elevation of a specific embodiment of a main conveyor.

FIG. 6 shows in detail a main conveyor according to the invention. Drive means 31 exerts a periodic longitudinal drive force on tray 12. The drive means may comprise an electromagnet. Leaf springs 13 support the tray 12 on the frame 11. The mountings of leaf springs 13 are angled, so that a longitudinal force applied to the springs gives both longitudinal and transverse components of motion. Frame 11 is mounted o anti-vibration feet 32. Product is transported along tray 12 in a series of hops. There is a wide aperture 16 at one end of the tray 12.

Figure 7:
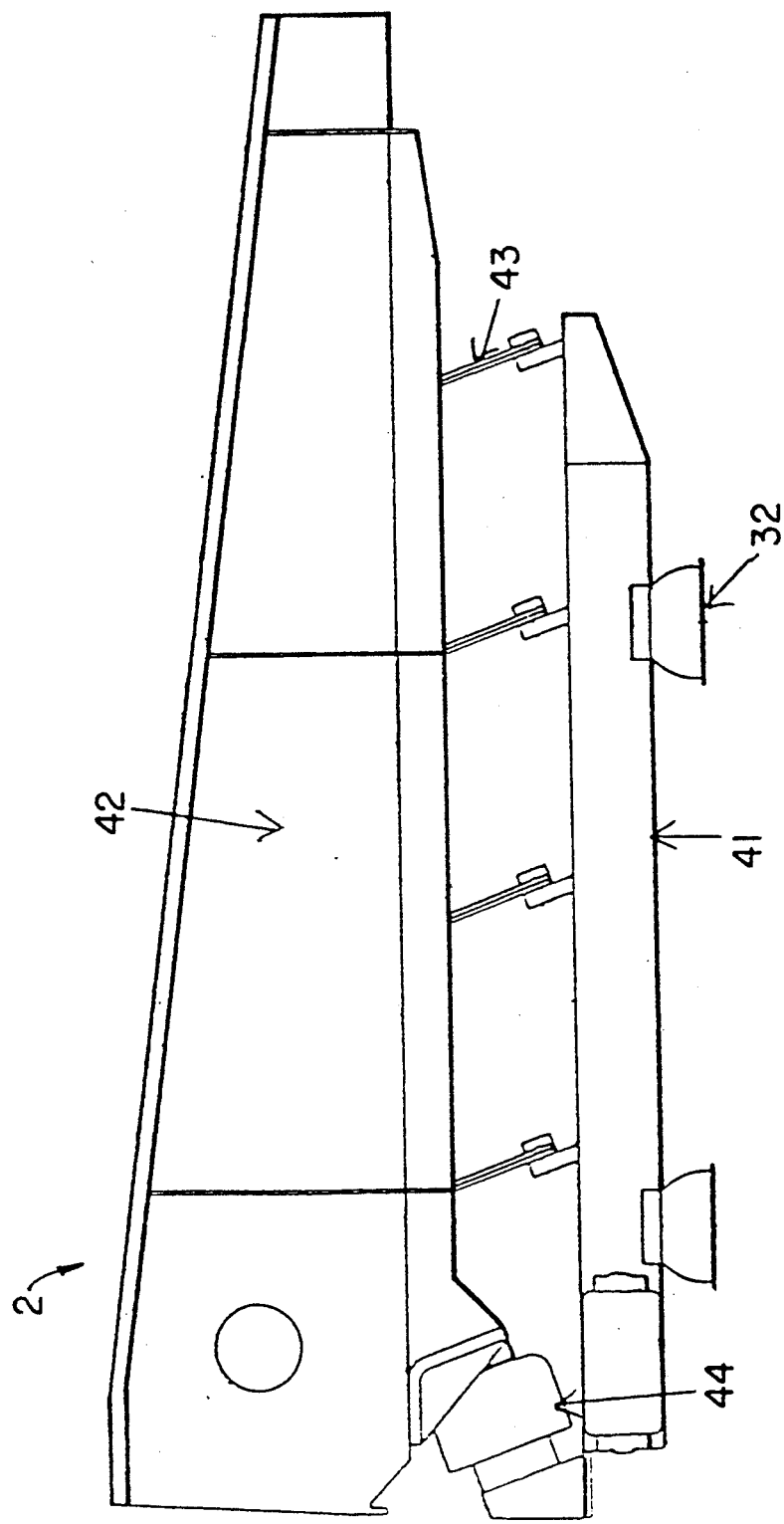
FIG. 7 is a side elevation (to a larger scale) of a specific embodiment of a crossfeeder.

FIG. 7 shows in detail one of the crossfeeders 2 which meet the main conveyor. The crossfeeder also has a drive means 44 a tray 42 and a frame 41. It also has leaf springs 43 to support the tray 42 on the frame 41, but the mounting of the springs is not angled, so that the longitudinal force applied to the springs by the drive means results in only a longitudinal component of motion. Frame 41 is mounted on anti-vibration feet 32. The mountings of the main conveyors and the crossfeeders are independent of each other.

Figure 8:
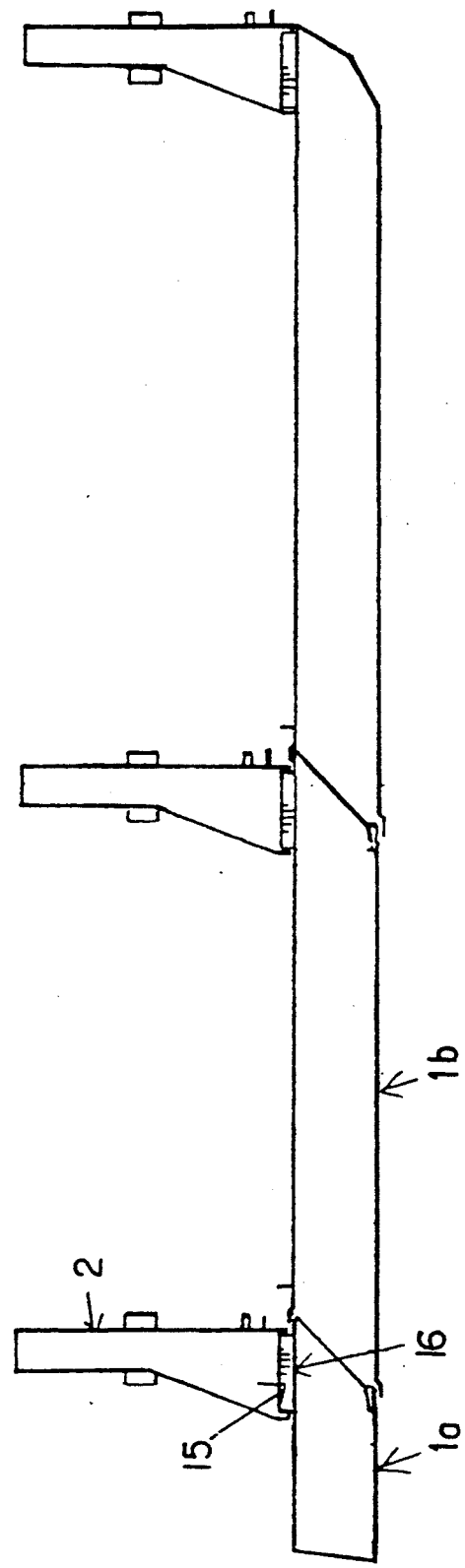
FIG. 8 is a plan view of a specific embodiment of a conveyor system according to the invention.

FIG. 8 shows in detail an arrangement of main conveyors 1 and cross feeders 2. As described above, product is transported along a main conveyor 1a in a series of hops. As product reaches the end of a main conveyor 1a, it may either pass on to the next main conveyor 1b, or else pass over lip 15 through side aperture 16 on to a cross feeder 2. There is no actual connection between main conveyor tray 12 and crossfeeder tray 42, so the motion of the two trays is not coupled.

Figure 9:
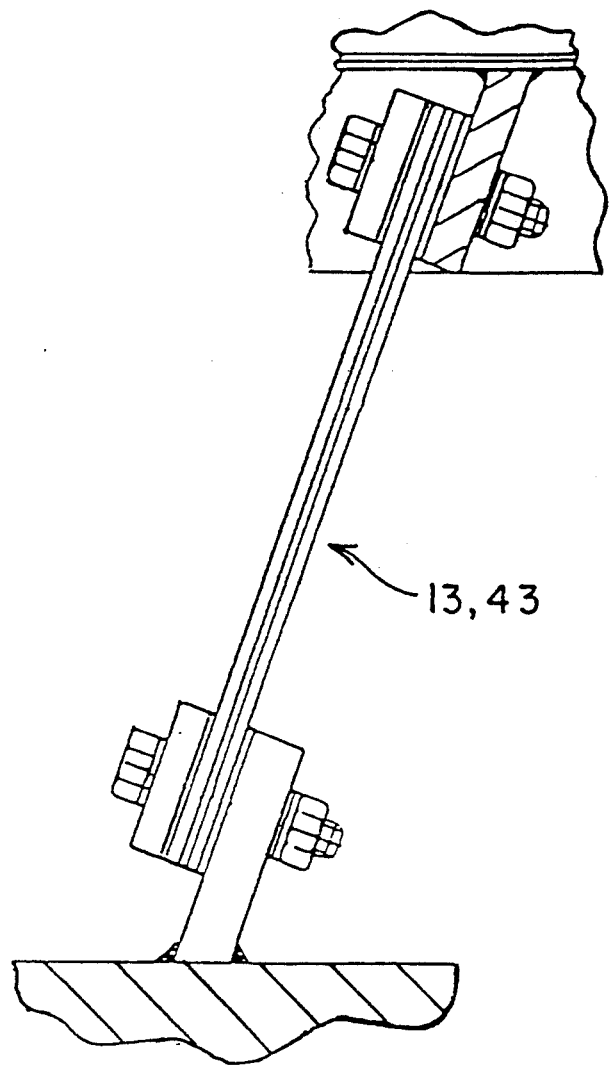
FIG. 9 is a side elevation of a specific elevation of a specific embodiment of a leaf spring mounting, viewed in the plane of the spring.

FIG. 9 shows a leaf spring 13, 43 as mounted between a tray 12, 42 and a frame 11, 41. The spring is pictured in its own plane, which is at an angle to the tray for the main conveyor mounting, and which is normal to the longitudinal direction of the tray for the crossfeeder. The leaf spring is bolted to mounting bushes which in turn are welded to the tray or frame respectively.

What we claim is:

1. A vibratory conveyor system for transporting a product, comprising a series of contiguous main line conveyors transporting the product in a longitudinal direction of the conveyor system, a crossfeeder conveyor extending transversely away from a lateral edge of the downstream end of each main line conveyor, at least one vibration means for imparting to at least an upstream end of each main line conveyor a vibratory movement, said vibratory movement of each main line conveyor being the sole movement and having both a component tending to transport said product longitudinally along the main line conveyor and a component tending to transport said product towards said lateral edge; and means provided wherein the crossfeeder conveyor meets each main line conveyor for permitting said product to pass from each main line conveyor to the crossfeeder conveyor.

2. A conveyor system according to claim 1, wherein the said means to pass the crossfeeder conveyor is an aperture in a side wall of the main line conveyor.

3. A conveyor system according to claim 2, wherein a gate is provided for selectively closing the said aperture.

4. A conveyor system according to claim 1, wherein at least the upstream one of the main line conveyors comprises a base and a product-carrying tray connected thereto by resilient mountings.

5. A conveyor system according to claim 4, wherein the resilient mountings are leaf springs arranged so that their natural direction of flexure is at an acute angle to the longitudinal direction of the main line conveyors.

6. A conveyor system according to claim 4, wherein the resilient mounts are rubber mounts arranged so that their natural direction of flexure is at an acute angle to the longitudinal direction of the main line conveyors.

7. A conveyor system according to claim 1, said vibration means wherein comprises two drive means each providing a respective one of the said components of movement.

8. A conveyor system according to claim 1, comprising at least two main line conveyors, the crossfeeder conveyor being provided at the downstream end of the upstream one of the two main-line conveyors.

9. A conveyor system according to claim 1, wherein there are more than two of the said main line conveyors arranged end-to-end, each except, optionally, the one furthest downstream being of the same type as the said upstream one of the two main line conveyors and each, optionally, having a respective crossfeeder conveyor extending laterally therefrom.

* * * * *